March 12, 1940.   J. BURNHAM   2,193,710
ELECTRICAL CONDENSER
Filed Sept. 1, 1937
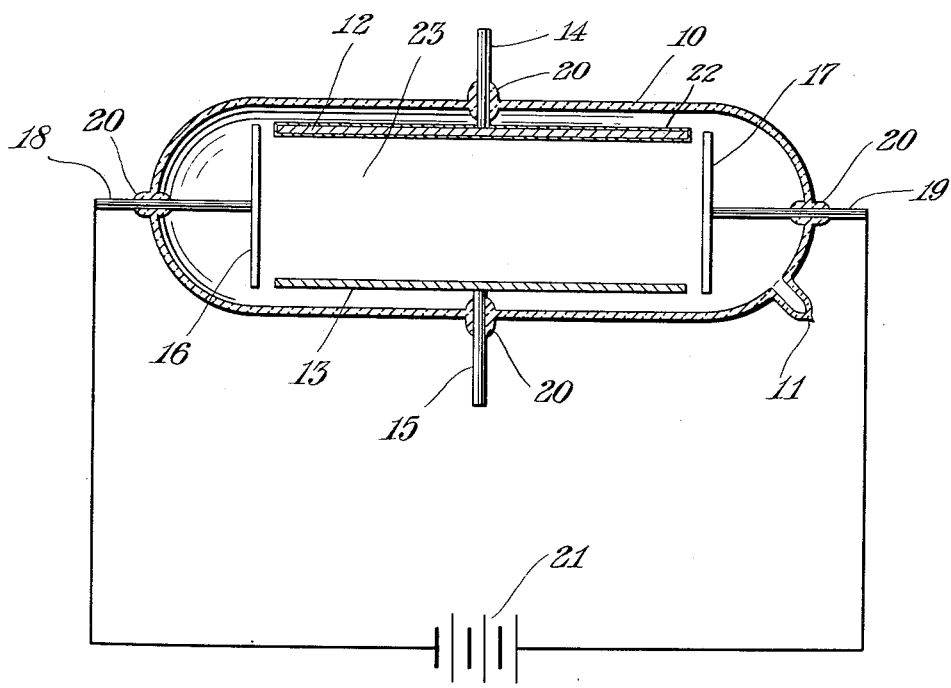
INVENTOR.
JOHN BURNHAM
BY Dorsey, Cole & Garner
ATTORNEYS Patented Mar. 12, 1940

2,193,710

UNITED STATES PATENT OFFICE 2,193,710

ELECTRICAL CONDENSER

John Burnham, North Adams, Mass., assignor to Sprague Specialties Company, North Adams, Mass., a corporation of Massachusetts Application September 1, 1937, Serial No. 162,026

4 Claims. (Cl. 250—27.5)

The present invention relates to electrical condensers and more particularly to a novel form of condenser having the desirable characteristics of an electrolytic condenser without its drawbacks.

Present-day electrolytic condensers comprise one or more filmed electrodes submerged or embedded in a suitable film-maintaining electrolyte. Such condensers are widely used because of their small size and low cost for a given capacity, as compared with other types of condensers. They have, however, various drawbacks, for example that a considerable amount of gases is liberated during their operation, and special venting means have to be provided for the escape of such gases. Furthermore, the escape of gases means loss of electrolyte, which loss is increased by further electrolyte being carried away through the venting means, partly in liquid form and partly as a vapor of water or other volatile components of the electrolyte. Such loss is highly objectionable as it gradually alters and depletes the electrolyte and thereby impairs the proper functioning of the condensers.

Another disadvantage of these condensers is that the filmed electrode surfaces tend to corrode because of the action on same of the electrolyte and of the contaminations of the electrolyte, the above referred to gas liberation being in part a result of this action.

One object of my invention is therefore to provide a condenser which maintains the advantages of electrolytic condensers without having the above-mentioned drawbacks.

Another object of the invention is to provide a condenser which does not require a film-maintaining electrolyte to maintain in working order the dielectric film of the electrode, or venting means for the escape of gases.

A still further object of the invention is to provide a condenser of the above type in which a gas or gas mixture serves as ionization medium and which medium neither decomposes nor produces corrosion in operation.

Other objects of the invention will appear as the description progresses.

According to the invention I provide a condenser having a hermetically sealed container and at least one electrode provided with a dielectric film. Similar to conventional electrolytic condensers, for so-called D. C. use, it suffices to have one electrode provided with a film, whereas for so-called A. C. use both electrodes are provided with a film. While it is advantageous to use as the material for the electrode or electrodes to be provided with a film, film-forming metals, such as aluminum, magnesium, tantalum, etc., and to form the film thereon electrolytically in a conventional manner, this is not altogether necessary. Condensers of similar characteristics and giving satisfactory results can also be obtained by making these electrodes from a non-filming metal, for example copper, or even from a non-metallic conductor, and apply to the electrode a thin layer of dielectric preferably consisting of a suitable oxide, for example aluminum oxide, magnesium oxide, zirconium oxide, or of a non-oxidizable substance, for example quartz, talc, glass. Such dielectric layer can be app ied to the electrode by sublimation, cataphoretic deposition, or other suitable process permitting the formation of a layer which is closely continuous to the electrode surface and is capable of following its irregularities.

In the preferred embodiment of my invention, which I shall describe in detail hereinafter, the electrodes which are to be provided with the film consist of filming metal and preferably of aluminum, and the film is electrolytically formed thereon.

In addition to the condenser electrodes I provide in the container a gaseous filling and means to ionize same. As such ionization means I use as a rule auxiliary electrodes across which I apply a suitable potential which establishes a gaseous discharge in the container, and so dispose the condenser electrodes as to expose to the gaseous discharge their entire area.

It will be noted that the function of the electrolyte of conventional electrolytic condensers to act as a conducting medium between the film of one electrode and the other electrode, is taken over in my condensers by the ionized gaseous layer.

While the electrolyte of conventional electrolytic condensers, besides serving as conducting medium, also acts as a film-maintaining agent, which in operation provides for a continuous correction and rejuvenation of the film, such action of the electro.yte is only required because of the inherent shortcomings of these condensers; i. e., in view of the corrosive influence on the film of the electrolyte, and of its contamination.

In the condensers of my invention such film-maintaining or repairing action is not necessary as a rule, because there is no corrosive attack by the gas on the film. Nevertheless, for condensers which are to be operated above or close to their breakdown voltage, and where thus some mechanical injury may occur to the film, I sometimes prefer to add to the gaseous filling a suitable amount of oxygen, which, as is well known, under the conditions of an arc discharge reacts with aluminum to form aluminum oxide. This oxygen may be added to the filling in the form of gas, or I may provide in the container an oxygen-liberating substance, for example mercurous oxide, mercuric oxide, sodium peroxide, etc., which liberates oxygen in the amount required to maintain it at a constant pressure.

As gaseous filling any gas may be used which has no corrosive action on the condenser elements; rare gases, as neon, argon, helium, krypton, because of their low breakdown voltage and inertness, are most suitable.

As a rule I prefer to use a mixture of two gases, for example a filling of neon to which is added a small quantity of a gas which forms metastable ions above the ionization potential of the first gas, for instance argon or mercury vapor. Such addition not only lowers the breakdown voltage but renders the discharge less critical to changes in pressure.

For instance, by adding .001–.005% argon to neon, the discharge voltage is lowered from about 350 volts to about 150 volts, and the stability of the discharge is greatly increased.

My invention will be illustrated in connection with a condenser shown in the single figure of the drawing forming part of the specification.

The condenser comprises a sealed cylindrical container 10 shown as consisting of glass or other gas-impervious insulating material. If the container is made of metal, certain constructional modifications later to be described are required. The exhaust and filling of the container 10 takes place through an exhaust tube 11, which is sealed after the container has been exhausted and the desired amount of gaseous filling has been admitted.

Axially disposed within the container are elongated, usually rectangular electrode plates 12 and 13 one or both of which are of a film-forming metal such as aluminum, tantalum, zirconium, etc.

In the condenser, as shown, only the electrode 12 is provided with a film 22, this electrode serving as the anode of the condenser. For alternating current circuits the electrode 13 is similarly provided with a film.

The electrodes 12 and 13 are carried by and are electrically connected with the terminal conductors 14 and 15 respectively, which are hermetically sealed through reinforced portions 20 of the container 10. The conductors 14 and 15 are preferably of the same metal as the respective electrode. Provided substantially at the two ends of container 10 are disc-shaped auxiliary electrodes 16 and 17, preferably made of a low-resistance conducting material, for instance carbon, copper, aluminum etc. The electrodes 16 and 17 are supported by and electrically connected with terminal conductors 18 and 19 respectively, which are hermetically sealed through reinforced portions 20 of the container 10. It should be understood that the material of the conductor portions passing through the container portions 20 and the material of the portions 20 are so selected that a good seal can be obtained. For example, with filmed aluminum a good seal can be obtained when using $Al_2O_3$ containing vitreous material; again, for the conductor of the auxiliary electrode I may use dumet wire, which makes a good seal with ordinary lime and lead glass.

In case the container 10 is of metal, the conductors 14, 15, 18 and 19 have to be insulated from the container, for example by fusing glass beads around these conductors, and by making the container—at least in its portions where the conductors pass—of a metal or alloy to which glass can be hermetically fused. Such constructions, well known in the art, do not need further description.

While the container 10 is shown as consisting of a single piece, it should be well understood that it actually is made up of two or more parts which, after the electrode members have been properly assembled therewith, are air-tightly secured to each other—usually by fusing in case of vitreous containers and by welding or soldering in case of metal containers.

For the operation of the condenser a suitable voltage, which may be a D. C. or A. C. voltage, is applied across the electrodes 16 and 17, which is obtained, for example, from a dry battery 21. When using such condensers in the filter circuits of radio sets, the plate voltage source for the radio tubes may be used for this purpose by providing a proper circuit arrangement.

The gas filling 23 consists of a chemically-inactive gas having a low ionizing voltage, such as neon, argon, helium, or mixtures of same. As a rule I use neon with a small addition of argon.

In the manufacture of the condensers of the invention I usually affix to the electrode or electrodes to be provided with a film, their respective terminal conductor, and if both the electrode and the terminal conductor are of filming metal I subject them together to film formation. If only the electrode is of filming metal I coat the terminal conductor with an insulating layer of shellac, varnish or the like, before subjecting the electrode to film formation.

As a rule when using aluminum electrodes, I provide thereon electrolytically a substantially unhydrated film. A suitable forming electrolyte is one comprising 140 grams of boric acid per litre of water, and for formation I use a current density of 50–60 milliamperes per square inch of anode surface. A suitable formation time is about 15 to 20 minutes, whereby I gradually increase the forming voltage to its maximum value, for example to 550 volts, and then allow it to remain at such maximum value for the remainder of such forming time. After removing the formed electrode from the electrolyte, I wash it in distilled water so as to remove all traces of the acid, after which I dry it at 120° C. for one hour so as to remove therefrom all traces of moisture.

The main and auxiliary electrodes are then mounted in their respective positions in the container, which, as previously stated, is made of two or more parts, such parts being then airtightly sealed together.

The exhaust tube 11 of the container is then attached to a suitable high-vacuum pump and the container is evacuated to a pressure of one to two microns of mercury. Occluded gases are removed by suitable heating of the component parts during the evacuation, as is well known in the art. After the container has been properly evacuated and the component parts freed from their occluded gases, a suitable gas filling is introduced, for example neon of a pressure of 25 to 40 millimeters of mercury, which neon preferably contains about .002% argon.

The container is then sealed at 11 and the condenser is ready for operation in a suitable circuit.

The main electrodes 12 and 13 are connected in the operating circuit in the same manner as would be an electrolytic condenser which it is adapted to replace.

For the auxiliary electrodes 16 and 17 a potential is required of sufficient magnitude to establish and maintain a gaseous discharge between the same. In case of a gaseous mixture, as above stated, a voltage of 150 to 175 volts is required for this purpose. This provides an ionic conductor which has a low-series resistance and low power factor.

It should be noted that the condensers so obtained have for a given electrode area and forming voltage a capacity and a breakdown voltage which favorably compares with those of a conventional electrolytic condenser having the same electrode area and formed at the same voltage. Thus condensers having a capacity of several microfarads and adapted to stand several hundred volts, can be obtained in a small volume, such condensers having the further advantages previously enumerated.

Condensers of this type can also be suitably combined in a single structure with gaseous discharge lamps, whereby the gas filling of the lamp serves as the ionizing medium of the condenser. Such arrangement, which permits a convenient provision of the comparatively large-capacity condensers required for the power factor correction of such discharge lamps, however, does not form part of the present invention.

While I have described my invention in connection with specific embodiments and in specific applications, I do not wish to be limited thereto, but desire the appended claims to be construed as broadly as permissible in view of the prior art.

What I claim is:

1. An electrical condenser having a sealed container, comprising a gaseous filling therein, an electrode provided with a dielectric film and another electrode, both electrodes disposed within said filling, and means to maintain said gaseous filling ionized.

2. An electrical condenser having a container comprising a gaseous filling, a condenser electrode provided with a dielectric film and a second condenser electrode provided within said filling, and auxiliary electrodes in said container to maintain a gaseous discharge in said container.

3. An electrical condenser having a container comprising a gaseous filling, a condenser electrode provided with a dielectric film and a second condenser electrode, and auxiliary electrodes in said container to maintain a gaseous discharge in said container, said condenser electrodes being disposed between said auxiliary electrodes and exposed to said gaseous discharge.

4. An electrical condenser comprising a cylindrical sealed container, a gaseous filling in said container, and two electrodes of filming metal provided with electrolytically-formed film, and two auxiliary electrodes at the two ends of the container adapted to establish a discharge in said container to ionize said gaseous filling.

JOHN BURNHAM.